Patented June 3, 1952

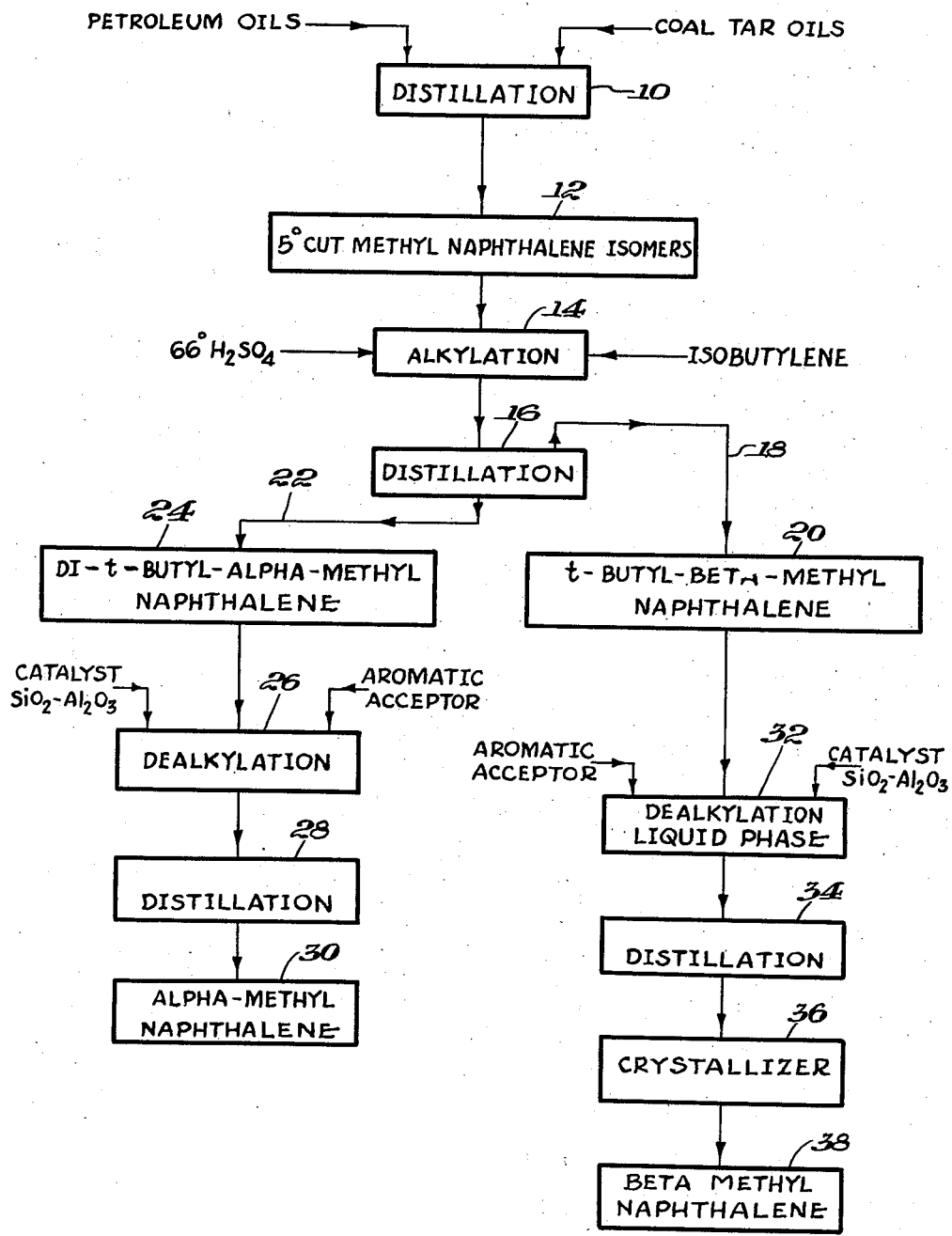

2,598,715

UNITED STATES PATENT OFFICE 2,598,715

SEPARATION OF NAPHTHALENE ISOMERS

Joseph E. Nickels, Pittsburgh, Pa., assignor to Koppers Company, Inc., Pittsburgh, Pa., a corporation of Delaware Application December 31, 1948, Serial No. 68,480

9 Claims. (Cl. 260—671)

This invention relates to the separation of alkyl naphthalene isomers particularly alpha- and beta-alkyl substituted isomeric naphthalenes in which the common substituent alkyl group is selected from the group consisting of primary and secondary alkyl groups having from one to five carbon atoms. More particularly the invention relates to the separation of alpha- and beta-isomers of methylnaphthalene. The separation of the beta-isomer from a mixture of the alpha- and beta-methylnaphthalenes by freezing with crystallization has been quite satisfactory. The crystallization separation of the alpha-isomer from a mixture of alpha- and beta-isomers of methylnaphthalene has not been satisfactory. For example, the eutectic of a mixture of alpha- and beta-methylnaphthalenes is about 81% alpha- and 19% beta-methylnaphthalene.

Because of small difference (about 3.5° C.) in the boiling temperature of the alpha- and beta-isomers, it is difficult to effect their separation by fractional distillation to get pure isomers.

The primary object of the present invention is to provide a process for efficiently separating the alpha- and beta-isomers of alkyl naphthalenes.

Another object of the invention is to provide a process of separating the alpha- and beta-isomers of alkyl naphthalenes without destroying or isomerizing the alpha-isomers.

Accordingly another object of the invention is to provide a process of separating alpha- and beta-substituted naphthalene isomers.

In the separation of alpha- and beta-isomers of methylnaphthalene, the isomers are alkylated with isobutylene in the presence of an alkylation catalyst such as 66° Bé. sulphuric acid wherein a mono-tertiary-butyl-beta-methylnaphthalene and a di-tertiary-butyl-alpha-methylnaphthalene are formed. These are new products which are good high-boiling solvents and form intermediate products for the manufacture of other substituted naphthalenes.

With these and other objects in view the invention consists in the process of separating alpha- and beta-isomers of alkyl naphthalenes as hereinafter described and more particularly defined in the claims.

Important features of the invention are illustrated in the accompanying drawing which is a flow sheet showing the various steps involved in separating and recovering alpha- and beta-isomers in purified form.

The alpha- and beta-isomers of methylnaphthalene are found in coal tar distillates and in petroleum distillates. The cut containing the alpha- and beta-isomers of methylnaphthalene may be separated by an efficient fractional distillation into a 5° cut or fraction boiling between about 240° and 245° C. at atmospheric pressure. Generally the beta-isomer forms the major portion of the mixture, that is varying from 50% to 75% of the mixture, most of the remainder being the alpha-isomer.

I have found that this mixture of alpha- and beta-isomers of methylnaphthalene may be separated by alkylating the mixture with a tertiary olefine to form the corresponding tertiary-alkyl methylnaphthalenes. For example in alkylating a mixture of alpha- and beta-isomers one mol of isobutylene reacts with one mol of beta-methylnaphthalene to form mono-tertiary-butyl-beta-methylnaphthalene and two mols of isobutylene react with one mol of alpha-methylnaphthalene to form di-tertiary-butyl-alpha-methylnaphthalene. The mono-tertiary-butyl-beta-methylnaphthalene is a liquid having a boiling point of 163° C. at 20 mm. pressure, while the di-tertiary-butyl-alpha-methylnaphthalene is a solid having a boiling point of 196° C. at 20 mm. pressure. This wide spread in boiling points permits these two isomers to be readily separated by fractional distillation.

The tertiary-alkylated alkylnaphthalene isomers may also be separated by crystallization, because of their difference in melting temperatures. For instance, tertiary-butyl-beta-methylnaphthalene is normally a liquid, whereas di-tertiary-butyl-alpha-methylnaphthalene is a solid melting at 79° C.

After the alpha- and beta-isomers have been separated by distillation or crystallization they may be dealkylated to form the alpha- and beta-methylnaphthalene isomers and thus effect a separation of the isomers.

The process of separating the alpha- and beta-isomers of methylnaphthalene in accordance with the preferred process may be carried out as follows, making reference to the drawing:

A close fraction of coal tar oils or of petroleum oil containing the methylnaphthalene isomers is introduced into a distillation tower 10 to make a close boiling cut of 240° to 245° C. This 5° cut is collected in a receiver 12 and then passed into an alkylation converter 14, together with 66° Bé. sulphuric acid and isobutylene at a temperature of 0° to 25° C. It is desirable to hold the temperature between 0° and 15° C. to avoid the sulphonation of the methylnaphthalene, but substantially no sulphonation takes place at temperatures below 25° C. As explained above the alkylation of the methylnaphthalene isomer mixture with isobutylene reacts to form mono-tertiary-butyl-beta-methylnaphthalene and di-tertiary-butyl-alpha-methylnaphthalene. A sufficient amount of isobutylene is used to supply one mol of isobutylene for each mol of beta-methylnaphthalene and two mols of isobutylene for each mol of alpha-methylnaphthalene.

In place of the 66° Bé. sulphuric acid catalyst, other alkylation catalysts may be used such as phosphoric acid, boron trifluoride, hydrogen fluoride, aluminum chloride, aluminum bromide and ferric chloride.

In place of isobutylene any tertiary olefine having four to six carbon atoms to the molecule may be used for aklylating the alkylnaphthalene such as methyl- and ethylnaphthalenes. Further the alkylation agent may be alcohols, alkyl halides or ethers which are capable of supplying a tertiary alkyl group of four to six carbon atoms.

The mixture of alkylated tertiary-butylmethylnaphthalene isomers is then fractionally distilled in a still 16 to take overhead through line 18, a cut of tertiary-butyl-beta-methyl-naphthalene to a receiver 20. A side cut of di-tertiary-butyl-alpha-methylnaphthalene is withdrawn through line 22 to receiver 24. In some instances it may, however, be preferred to separate the tertiary alkylated isomers by crystallization.

The di-tertiary-butyl-alpha-methylnaphthalene is then dealkylated in a converter 26 to which is added a silica-alumina catalyst and an aromatic compound as an olefine acceptor. I have found that a synthetic alumina-silica catalyst containing from 50% to 99% silica and 50 to 1% alumina is a satisfactory dealkylation catalyst. Other alumina-silica catalysts which are natural clays, such as filtrol, and superfiltrol an acid-treated clay, are also satisfactory as dealkylation catalysts. The silica-alumina contents of these clays comes within the scope of the synthetic alumina-silica catalysts above defined. The dealkylation step is carried out at a temperature of 150° to 250° C. under the vapor pressure of the mixture and is preferably carried out at such a rate that the di-tertiary-butyl-alpha-methylnaphthalene is not in contact with the catalyst for a longer period than three hours. By this means the di-tertiary-butylmethylnaphthalene may be dealkylated with a minimum amount of isomerization. The isomerization reaction forms the beta-methylnaphthalene. The dealkylation may also be performed in the vapor phase at 300° to 600° C. either in the absence or presence of inert atmospheres such as steam, nitrogen and carbon dioxide and/or olefine acceptors. The acceptors which are most desirable in the present process are aromatic compounds such as benzene, toluene, ethylbenzene, phenol and cresol. These acceptors enter into the reaction whereby the butyl molecule combines with the aromatic compound when it is split off from the di-tertiary-butyl-alpha-methylnaphthalene.

The alpha-methylnaphthalene formed in the dealkylation in converter 26 is then passed to a still 28 for the purpose of separating the alpha-methylnaphthalene from the reaction mixture, this product being collected in receiver 30. In order to avoid possibility of decomposition of the alpha-methylnaphthalene the distillation is preferably carried out under a slight vacuum. It has been found, however, that with an efficient fractionating still a vacuum is not essential.

The tertiary-butyl-beta-methylnaphthalene collected in the receiver 20 is passed to a dealkylation converter 32 where it is dealkylated at a temperature of 150° C. to 250° C. in the presence of an aluminum-silica catalyst, and an aromatic olefine acceptor or in the vapor phase at 300° to 600° C. as described above. The catalysts and acceptors for dealkylating the tertiary-butyl-beta-methylnaphthalene are the same as the catalysts and acceptors used in dealkylating the di-tertiary-butyl-alpha-methylnaphthalene. If the dealkylated beta-methylnaphthalene content of the receiver is comparatively high, that is 75% or more, a substantially pure beta-methylnaphthalene may be recovered by a distillation in still 34. If the beta-methylnaphthalene content from the receiver 32 is 50% or less, then the beta-methylnaphthalene recovered by an efficient distillation will vary from about 70 to 80% beta-methylnaphthalene. In order to obtain a practically pure beta-methylnaphthalene, the distillation product is passed into a crystallizer 36 and cooled to a temperature of approximately —20° C. The beta-methylnaphthalene recovered from the crystallizer is passed to a receiver 38 and is practically 100% pure product.

The di-tertiary-butyl-alpha-methylnaphthalene and the tertiary-butyl-beta-methylnaphthalene may be dealkylated in the liquid phase at the temperature conditions described above. However, if desired, the dealkylation may be carried out in the vapor phase using a synthetic alumina-silica catalyst either in the absence or presence of an inert atmosphere such as steam, nitrogen and carbon dioxide. In the vapor phase a higher temperature of 300° to 600° is required. Other vapor phase dealkylation catalysts, such as naturally occurring clays and acid treated clays as described hereinbefore, may be used in place of the synthetic alumina-silica catalysts.

As an example of the butylation of an isomer cut from coal tar containing an average of 70% alpha-isomer and boiling between 240° and 245° C., 1510.2 grams of the isomer mixture was alkylated in the presence of 457.6 grams of 66° Bé. sulphuric acid in an excess of isobutylene. From the butylated mixture were obtained 18.7% by volume and 20.2% by weight of mono-tertiary-butyl-beta-methylnaphthalene boiling between 161° and 165° C. at 20 mm. pressure and 42.6% by volume or 45.2% by weight of ditertiary-butyl-alpha-methylnaphthalene boiling between 193° and 200° C. at 20 mm. pressure. The cut boiling between 193° and 200° was then dealkylated in the presence of superfiltrol as the catalyst under different times and pressures as shown in the following table to give the yields shown therein:

TABLE

Dealkylation of Di-tertiary-Butyl-Alpha-Methylnaphthalene

| Di-tertiary-Butyl-Alpha-Methylnaphthalene, Grams | Benzene, Grams | Catalyst, Grams | Time, Hrs. | Temp., °C. | Alpha-Isomer-Yield, Per cent | Purity of Alpha-Isomer, Per cent |
|---|---|---|---|---|---|---|
| 210 | 1,291 | 42 | 3 | 175 | 79.8 | 97.8 |
| 210 | 1,291 | 42 | 3 | 200 | 92.3 | 96.0 |
| 325 | 994 | 65 | 3 | 175 | 92.6 | 97.2 |

As shown in the above table, all of the alpha isomer had a purity of greater than 95 percent.

One cut boiling between 160° and 165° C., obtained from the distillation of the butylated methylnaphthalene was dealkylated in the presence of superfiltrol with benzene as the acceptor. For example, 158 grams of the cut obtained by the distillation were dealkylated in the presence of 31.6 grams of superfiltrol and 1248 grams of benzene at a temperature of 200° C. for three hours to produce a 93.9% yield (106.4 grams) of beta-methylnaphthalene having a purity of 70.5%. When the product was carefully distilled through a highly efficient column 60 grams of pure beta-methylnaphthalene were recovered.

By repeating this process using 158 grams of the cut boiling between 160° and 165° C., dealkylating in the presence of 1248 grams of benzene and 31.6 grams of superfiltrol at a temperature of 200° C. for three hours, 105 grams of 70.5% beta-methylnaphthalene was obtained. By cooling this mixture of beta-methylnaphthalene to a temperature of −20° and separating the crystals 63.5 grams of beta-methylnaphthalene of 95% purity were recovered.

In accordance with another example 119 grams of the fraction boiling between 160° and 165° C. was dealkylated in the presence of 1272 grams of ethylbenzene and 25 grams of superfiltrol for three hours at 175° C. By this action a yield of 78.3% (66.9 grams) of beta-methylnaphthalene containing 72.8% of beta-isomer was recovered. The ethylbenzene was used as an efficient equilibrator in this example instead of benzene for production of beta-methylnaphthalene. By efficient distillation substantially 40.5 grams of pure beta-methylnaphthalene were recovered.

In a second example using 119 grams of the fraction boiling between 160° and 165° C. and dealkylating with 1272 grams of ethylbenzene in the presence of 25 grams of superfiltrol for three hours at 175° C., 77 grams of beta-methylnaphthalene containing 72.8% beta-methylnaphthalene was recovered. By crystallization of this beta-methylnaphthalene when freezing at a temperature of −20° C., 46 grams of beta-methylnaphthalene were recovered having a purity of 96% beta-methylnaphthalene.

In the above described process the alkylation products as well as the dealkylation products may be separated by distillation or by crystallization. In the claims these processes of separation are defined as "purification separation" or "physical separation."

In place of a mixture of isomers of methylnaphthalene a mixture of alpha- and beta-isomers of ethylnaphthalene has been treated by the same process using isobutylene as the alkylating olefine and sulphuric acid as the catalyst for alkylation. The alkylated ethylnaphthalene isomers may then be dealkylated with a superfiltrol catalyst at a temperature of 150° to 250° C. in the presence of an ethylbenzene acceptor. The yields obtained in the separation of the alpha- and beta-ethylnaphthalene isomers are approximately the same as that obtained in the separation of alpha- and beta-methylnaphthalene isomers.

The preferred form of the invention having been thus described, what is claimed as new is:

1. A method for the separation of the alpha isomer from a mixture of alpha- and beta-alkyl substituted isomeric naphthalenes in which the common substituent alkyl group is selected from the group consisting of primary and secondary alkyl groups having from one to five carbon atoms which comprises forming a mono-tertiary alkyl derivative of the beta-isomer and a di-tertiary alkyl derivative of the alpha isomer by reacting said mixture with an alkylating agent containing a tertiary alkyl group having from four to six carbon atoms in the group, said alkylating agent being present in an amount sufficient to furnish one mole of alkylating agent per mole of beta-isomer reacted and two moles of alkylating agent per mole of alpha-isomer reacted, physically separating from the alkylated mixture the di-tertiary alkyl derivative of the alpha isomer, and dealkylating the derivative so separated to produce the alpha isomer.

2. A method for the separation of the alpha isomer from a mixture of alpha- and beta-isomers of methylnaphthalene which comprises forming a mono-tertiary alkyl derivative of the beta-isomer and a di-tertiary alkyl derivative of the alpha isomer by reacting said mixture with an alkylating agent containing a tertiary alkyl group having from four to six carbon atoms in the group, said alkylating agent being present in an amount sufficient to furnish one mole of alkylating agent per mole of beta-isomer reacted and two moles of alkylating agent per mole of alpha-isomer reacted, physically separating from the alkylated mixture the di-tertiary alkyl derivative of the alpha isomer, and dealkylating the derivative so separated to produce the alpha isomer.

3. A method for the separation of the alpha isomer from a mixture of alpha- and beta-isomers of ethylnaphthalene which comprises forming a mono-tertiary alkyl derivative of the beta-isomer and a di-tertiary alkyl derivative of the alpha isomer by reacting said mixture with an alkylating agent containing a tertiary alkyl group having from four to six carbon atoms in the group, said alkylating agent being present in an amount sufficient to furnish one mole of alkylating agent per mole of beta-isomer reacted and two moles of alkylating agent per mole of alpha-isomer reacted, physically separating from the alkylated mixture the di-tertiary alkyl derivative of the alpha isomer, and dealkylating the derivative so separated to produce the alpha isomer.

4. A method for the separation of the alpha isomer from a mixture of alpha- and beta-alkyl substituted isomeric naphthalenes in which the common substituent alkyl group is selected from the group consisting of primary and secondary alkyl groups having from one to five carbon atoms which comprises forming a mono-tertiary alkyl derivative of the beta-isomer and a di-tertiary alkyl derivative of the alpha isomer by reacting said mixture with an alkylating agent containing a tertiary alkyl group having from four to six carbon atoms in the group, said alkylating agent being present in an amount sufficient to furnish one mole of alkylating agent per mole of beta-isomer reacted and two moles of alkylating agent per mole of alpha-isomer reacted, separating from the alkylated mixture the di-tertiary alkyl derivative of the alpha isomer, dealkylating the derivative so separated in the presence of an aromatic hydrocarbon as an olefin acceptor to produce the alpha isomer, and producing purified alpha isomer by fractional distillation of the products of dealkylation.

5. A method for the separation of the alpha isomer from a mixture of alpha- and beta-alkyl substituted isomeric naphthalenes in which the common substituent alkyl group is selected from the group consisting of primary and secondary alkyl groups having from one to five carbon atoms which comprises forming a mono-tertiary derivative of the beta-isomer and a di-tertiary alkyl derivative of the alpha isomer by reacting said mixture with a tertiary alkene having from four to six carbon atoms in the presence of sulfuric acid under alkylation conditions including a temperature in the range of 0° to 25° C., said alkene being present in an amount sufficient to furnish one mole of alkylating agent per mole of beta-isomer reacted and two moles of alkylating agent per mole of alpha-isomer reacted, physically separating from the alkylated mixture the di-tertiary alkyl derivative of the alpha isomer, and dealkylating the derivative so separated to produce the alpha isomer.

6. A method for the separation of alpha- and beta-alkyl substituted isomeric naphthalenes in which the common substituent alkyl group is selected from the group consisting of primary and secondary alkyl groups having from one to five carbon atoms which comprises forming a mono-tertiary alkyl derivative of the beta-isomer and a di-tertiary alkyl derivative of the alpha isomer by reacting said mixture with an alkylating agent containing a tertiary alkyl group having from four to six carbon atoms in the group, said alkylating agent being present in an amount sufficient to furnish one mole of alkylating agent per mole of beta-isomer reacted and two moles of alkylating agent per mole of alpha-isomer reacted, separating the di-tertiary alkyl derivative of the alpha isomer and the mono-tertiary alkyl derivative of the beta-isomer by fractionally distilling the alkylated mixture, and separately dealkylating said derivatives so separated in the vapor phase in the presence of a silica alumina catalyst at a temperature in the range of 300° to 600° C. in the presence of an olefin acceptor, and separately distilling the product of said dealkylations to produce the purified isomers.

7. A method for the separation of alpha-methylnaphthalene and beta-methylnaphthalene from a mixture thereof which comprises forming a mono-tertiary-alkyl-beta-methylnaphthalene and a di-tertiary-alkyl-alpha-methylnaphthalene by reacting said mixture with a tertiary olefin having from four to six carbon atoms in the presence of sulfuric acid at a temperature in the range of 0° to 25° C., said olefin being present in an amount sufficient to furnish one mole of olefin per mole of beta-methylnaphthalene reacted and two moles of olefin per mole of alpha-methylnaphthalene reacted, separating from the alkylated mixture a di-tertiary-alkyl-alpha-methylnaphthalene fraction and a mono-tertiary-alkyl-beta-methylnaphthalene fraction by fractional distillation, and separately dealkylating said fractions to produce alpha-methylnaphthalene and beta-methylnaphthalene.

8. A method for the preparation of alpha-methylnaphthalene from a mixture containing other hydrocarbons including beta-methylnaphthalene which comprises fractionally distilling said mixture to produce a fraction normally boiling between 240° and 245° C., forming mono-tertiary-butyl-beta-methylnaphthalene and di-tertiary-butyl-alpha-methylnaphthalene by treating said fraction with isobutylene in the presence of sulfuric acid under alkylation conditions and at a temperature in the range of 0° to 25° C., said isobutylene being present in an amount sufficient to furnish one mole of isobutylene per mole of beta-methylnaphthalene reacted, and two moles of isobutylene per mole of alpha-methylnaphthalene reacted, fractionally distilling the alkylation products to produce a di-tertiary-butyl-alpha-methylnaphthalene cut, and dealkylating said cut in the presence of a silica-alumina catalyst under liquid phase conditions at a temperature in the range of 150° to 250° C. to produce alpha-methylnaphthalene, and separating from the dealkylation products alpha-methylnaphthalene having greater than 95 percent purity.

9. A method for the separation of alpha-methylnaphthalene from a mixture thereof with beta-methylnaphthalene which comprises forming mono-tertiary-butyl-beta-methylnaphthalene and di-tertiary-butyl-alpha-methylnaphthalene by reacting said mixture with isobutylene under alkylation conditions, said isobutylene being present in an amount sufficient to furnish one mole of isobutylene per mole of beta-methylnaphthalene reacted, and two moles of isobutylene per mole of alpha-methylnaphthalene reacted, physically separating from the alkylated mixture a predominantly di-tertiary-butyl-alpha-methylnaphthalene fraction, dealkylating said fraction to produce alpha-methylnaphthalene, and separating from the dealkylation products alpha-methylnaphthalene having greater than 95 percent purity.

JOSEPH E. NICKELS.

REFERENCES CITED

The following references are of record in the file of this patent:

UNITED STATES PATENTS

| Number | Name | Date |
|---|---|---|
| 1,767,302 | Michel | June 24, 1930 |
| 2,194,449 | Sachanen et al. | Mar. 19, 1940 |
| 2,370,810 | Morrell et al. | Mar. 6, 1945 |
| 2,436,110 | Larsen | Feb. 17, 1948 |
| 2,436,698 | Oblad | Feb. 24, 1948 |

OTHER REFERENCES

Darzens et al., Compt. rend. 199, 1426–8 (1934), Abstracted in Chemical Abstracts 29:18058.